United States Patent Office 2,957,805
Patented Oct. 25, 1960

2,957,805

THERAPEUTIC COMPOSITIONS FOR ORAL AND PARENTERAL ADMINISTRATION

Gilbert C. van Wessem, Memmingen, Germany, assignor to Warner-Lambert Pharmaceutical Company, Morris Plains, N.J., a corporation of Delaware No Drawing. Filed Sept. 17, 1957, Ser. No. 684,419

5 Claims. (Cl. 167—65)

This invention relates to therapeutic compositions, and more particularly, to compositions containing β,β-pentamethylene butyrolactone.

It has been found that oral and parenteral compositions may be prepared containing as an active ingredient β,β-pentamethylene butyrolactone. The lactone is present in a pharmaceutical carrier which may be in the form of suppositories, solutions, ampuled solutions or tablets.

The compositions of the invention are central nervous system stimulants. Specifically, the compositions have been found to be highly effective as analeptic agents useful for combatting excessive hypnosis such as that resulting from an overdose of barbiturates. The compositions are also useful as respiratory and cardiovascular stimulants. They may be prepared in effective dosage units for administration either orally or parenternally. The compositions do not produce undesirable side effects.

β,β-Pentamethylene butyrolactone is disclosed by Windaus et al., Ber., 55B, 3981 (1922). It may be prepared as follows:

One mol cyclohexanone is reacted with two mols ethyl cyanoacetate and three mols alcoholic ammonia; the resulting ammonium salt of β,β-pentamethylene-α,γ-dicyanoglutarimide is saponified in acid to yield cyclohexane diacetic acid. An ammoniacal solution of the latter is reacted with silver nitrate to yield the di-silver salt which on reaction with iodine yields β,β-pentamethylene butyrolactone.

The reaction sequence may be represented as follows:

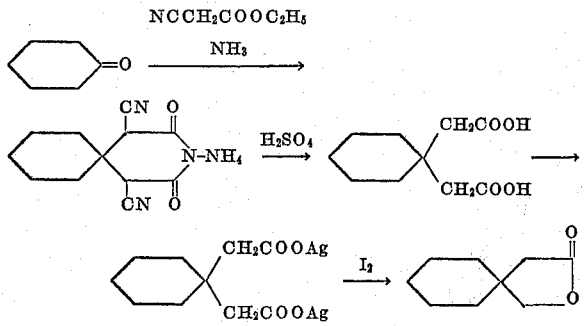

The compound is readily soluble in ethanol, ether, benzene, glacial acetic acid, acetic ether, ligroin and chloroform. It dissolves in water to the extent of about 0.5%.

The compositions for administration preferably contain 10 to 20 mg. of the lactone per dosage unit.

EXAMPLE I

*Suppositories*

| | G. |
|---|---|
| β,β-pentamethylene butyrolactone | 1 |
| Beeswax | 5 |
| Cacao butter | 91 |

The lactone is thoroughly mixed with molten beeswax and cacao butter at 38° C. and formed into 2 g. suppositories, each containing 20 mg. active ingredient.

EXAMPLE II

*Ampules, for injection*

| | |
|---|---|
| β,β-Pentamethylene butyrolactone | g.   0.5 |
| Water | ml.  99.5 |

The lactone is dissolved in the water at 40° C., filtered and sealed in 2 cc. ampules. The ampules are sterilized at 115° C. for 15 minutes. Each ampule contains 10 mg. active ingredient.

EXAMPLE III

*Solution for oral administration*

| | |
|---|---|
| β,β-Pentamethylene butyrolactone | g.   1.0 |
| Ethanol | ml.  15 |
| 1.2 propylene glycol | g.   10.4 |
| Ethyl p-hydroxybenzoate | g.   0.1 |
| Water | ml.  76.7 |

The lactone is added to a solution of ethyl p-hydroxybenzoate in ethanol and the glycol. Water is added, the clear solution filtered and bottled in 20 cc. bottles. Each cc. contains 10 mg. active ingredient.

EXAMPLE IV

*Tablets*

| | G. |
|---|---|
| β,β-Pentamethylene butyrolactone | 5 |
| Lactose | 80 |
| Corn starch | 95 |
| Magnesium stearate | 1 |
| Talcum | 15 |
| Formaldehyde-gelatin | 4 |

The lactone and lactose are ground together and mixed with the remaining ingredients. The mixture is granulated at 50° C., with 25 g. alcoholic gelatin and pressed into 0.4 g. tablets. Each tablet contains 10 mg. active ingredient.

EXAMPLE V

*Cored tablets for sugar coated tablets*

| | G. |
|---|---|
| β,β-Pentamethylene butyrolactone | 5 |
| Colloidal silica | 5 |
| Lactose | 40 |
| Corn starch | 44.5 |
| Talcum | 2.5 |
| Formaldehyde-gelatin | 2 |
| Magnesium stearate | 1 |

The lactone and silica are ground together, mixed with the lactose, corn starch, talcum and gelatin and tabletted. The tablets are crushed to 2 mm. size, mixed with the magnesium stearate and pressed into 0.2 g. tablets, each of which contains 10 mg. active ingredient.

Daily dose in humans is in the range of 5 to 100 mg.

While the invention has been described with particular embodiments thereof, it will be understood that in its broadest aspects, the invention may be variously embodied within the scope of the invention as set forth herein and in the appended claims.

What is claimed is:

1. A therapeutic composition in dosage unit form containing not more than 100 mg. of β,β-pentamethylene butyrolactone per unit and a pharmaceutical carrier.

2. The composition set forth in claim 1 wherein said dosage unit contains 5 to 100 mg. of said β,β-pentamethylene butyrolactone.

3. The composition set forth in claim 1 wherein said dosage unit contains 10 to 20 mg. of said β,β-pentamethylene butyrolactone.

4. The composition set forth in claim 1 wherein said carrier is a solid pharmaceutical carrier.

5. The composition set forth in claim 1 wherein said carrier is a liquid pharmaceutical carrier.

References Cited in the file of this patent

Windous et al.: Ber., 55B, 3891, 1922.
J. Inv. Derm., vol. 18, March 1952, p. 259.
Eckenhoff et al: JAMA, vol. 139, No. 12, March 19, 1949, pp. 780–5.
Bull. Johns Hopkins Hosp., vol. 85, No. 3, September 1949.
Beecher: JAMA, vol. 158, No. 5, June 4, 1955, pp. 399–401.
Beecher: JAMA, vol. 159, No. 17, Dec. 24, 1955, pp. 1602–6.
Kirby: JAMA, vol. 144, No. 3, September 16, 1950, pp. 233–236.
Chain: Antib. and Chemother., March 1954, pp. 215–252, esp. pp. 231–3.
Welch et al.: JAPA, Sci. Ed., vol. 39, No. 9, September 1950, pp. 486–489, esp. p. 489, col. 1.
Green: Chem. Age, vol. 60, Apr. 23, 1949, pp. 592–3, esp. 1st complete par. p. 593.
Gunnison et al.: Antibiotics and Chemotherapy, July 1951, pp. 259–266, esp. p. 264.
Nesbit et al.: Antibiotics and Chemother., 1952, p. 447, 2nd par.
Welch et al.: J. Lab. and Clin. Med., vol. 35, No. 5, May 1950, pp. 663–666.
Hayman: Am. J. Pharm., vol. 122, No. 2, February 1950, pp. 72–74, esp. p. 73, 4th par.
Allen et al.: Proc. Staff Meet. Mayo Clin., vol. 29, No. 17, Aug. 25, 1954, pp. 459–478, esp. p. 460.
Pearlman: JADA, vol. 48, January 1954, pp. 49–58.
Molitor et al.: J. Pharm. and Expt. Therap., vol. 98, April 1950, pp. 1–49, esp. par. con. top p. 47.
Harris et al.: J. Applied Physiology, vol. 7, No. 1, July 1954, pp. 84–88.
Holman et al.: "Progress in the Chem. of Fats and Other Lipids," vol. 3 (1955), Pergmon Press, New York, pp. 2–17.